United States Patent [19]
Lukas

[11] 3,876,914
[45] Apr. 8, 1975

[54] STATIC OVERCURRENT OR OVERVOLTAGE PROTECTION CIRCUIT

[75] Inventor: Stephen J. Lukas, Waynesboro, Va.

[73] Assignee: General Electric Company, Salem, Va.

[22] Filed: Aug. 1, 1973

[21] Appl. No.: 384,610

[52] U.S. Cl. ............. 317/141 S; 317/33 R; 317/38; 317/148.5 R
[51] Int. Cl. .......................................... H01h 47/18
[58] Field of Search............ 317/38, 141 S, 148.5 R, 317/33 R; 307/235 R

[56] References Cited
UNITED STATES PATENTS

| | | | |
|---|---|---|---|
| 2,372,134 | 3/1945 | Steeb | 317/38 X |
| 3,584,258 | 6/1971 | Barnett | 317/38 X |
| 3,604,983 | 9/1971 | Levin et al. | 317/38 |
| 3,654,516 | 4/1972 | Traversi | 317/38 X |

*Primary Examiner*—James D. Trammell
*Attorney, Agent, or Firm*—Arnold E. Renner

[57] ABSTRACT

A static control circuit for protecting a circuit against either a critically high instantaneous current or voltage or an abnormally high current or voltage which persists for an extended period of time includes an instantaneous relay circuit responsive to the critically high currents or voltages in the protected circuit and a delay relay circuit responsive to the extended abnormally high voltages or currents. Each relay, upon activation, serves to reduce, in an appropriate manner, the power supplied from a source to the protected circuit.

5 Claims, 3 Drawing Figures

STATIC OVERCURRENT OR OVERVOLTAGE PROTECTION CIRCUIT

BACKGROUND OF THE INVENTION

The present invention relates generally to protection circuits and more particularly to overcurrent or overvoltage protection circuits having particular application in excitation current monitoring circuits for self-excited dynamoelectric machines.

Although the present invention finds broad application in a variety of diverse operations, it is found to be particularly useful in the field of self-excited dynamoelectric machines. Self-excited dynamoelectric machines have, in recent years, employed what has become known as static excitation voltage developing systems. These systems, in general, include a pair of controlled rectifier bridge circuits used to control field current to the machine. (The most common controlled rectifier in use today is the silicon controlled rectifier, more often referred to as an SCR, which latter term will hereinafter be used for sake of convenience.) In high power applications, which is quite often the case with this type of an arrangement, the field current through the SCR circuits must be closely monitored for the protection of the SCRs. Regulator circuits which adjust field current to the SCRs usually include a means for holding the current to some safe limit. Safety circuits, however, are also generally provided and usually include means for reducing the current through the SCRs to a safe level by an alternate method in the case where the primary method of protection fails. Monitoring of this safe level has most often included some means for generating a control voltage proportional to the current through the SCRs. Thus, by monitoring the level of the control voltage, current through the SCRs may also be monitored.

Merely monitoring the instantaneous level of current through the SCRs does not, however, provide adequate protection since it is the heat generated by the current through an SCR which most often causes failure and the heat thus generated does not normally dissipate linearly with a decrease in current, but instead, "builds up" or is cumulative within the SCRs. For example: a current of 90 amperes flowing for 15 seconds through an SCR might be of inconsequential importance as far as the SCR is concerned, while 60 amperes of current through the same SCR for a period of 15 minutes might be devastating.

Thus, rather than involving sensitive and generally expensive heat sensing devices, the practice has been to monitor the level of current through an SCR over a measured period of time and thereby determine if an excessive amount of heat would have been generated. Measuring heat accumulation in this manner, however, is complicated by the fact that the protecting circuit must include means for recalling recent current levels and the durations. It should be clear that a moderate current increase for a relatively short period of time would be adequate cause for concern if the SCR had very recently been subjected to a high current for a relatively long period of time.

Known prior art solution to these problems included a somewhat cumbersome and unreliable liquid filled plunger-arrangement which, after being actuated, required the manual throwing of a discharging knife switch before circuit operation could be renewed. The circuit of the subject invention avoids these problems by providing a simple and totally electronic switching circuit which provides practical solutions for the above-described problems.

SUMMARY OF THE INVENTION

The present invention may be described in general terms as a circuit for monitoring a current or voltage through a protected circuit wherein the cumulative effect of the monitored current or voltage over a finite period of time is not inconsequential. Briefly, the circuit provides means for responding to a d.c. control voltage representative of a monitored current or voltage in a protected circuit. The level of the d.c. control voltage is constantly monitored by a circuit which responds to an increase thereof above a normal level below which the monitored current or voltage could persist safely for an indefinite period of time. When the d.c. control voltage remains above the normal level for some finite period of time, dependent upon the actual level of the d.c. control voltage, a transistor switching circuit causes a relay to be energized and reduce the voltage to the monitored circuit. Similarly, after the d.c. voltage level has decreased to below the critical level for some finite period of time, again dependent upon the actual level of the d.c. control voltage, the transistor switching circuit causes the relay to deenergize and thus reestablish normal voltage to the monitored circut. The system provides means for storing the cumulative effects of this monitored voltage or current so as to react protectively to a prolonged persistency of voltage or current above a normal level in the monitored circuit, even though the monitored current or voltage varied widely over some relatively short period of time. Also included, in the preferred embodiment, is a second relay which reacts substantially instantaneously to an overcurrent or overvoltage of a magnitude which would cause immediate damage to the protected circuit.

Accordingly, one object of the present invention is to provide a new and improved overcurrent or overvoltage monitoring circuit.

Another object of the present invention is to provide a new and improved overcurrent or overvoltage relay monitoring circuit which includes means for electronically recalling previous current conditions of relative importance to cumulative heating problems.

These and other objects of the present invention will become apparent from the detailed description of the accompanying drawings.

DESCRIPTION OF THE PREFERRED EMBODIMENT

Figure 1:
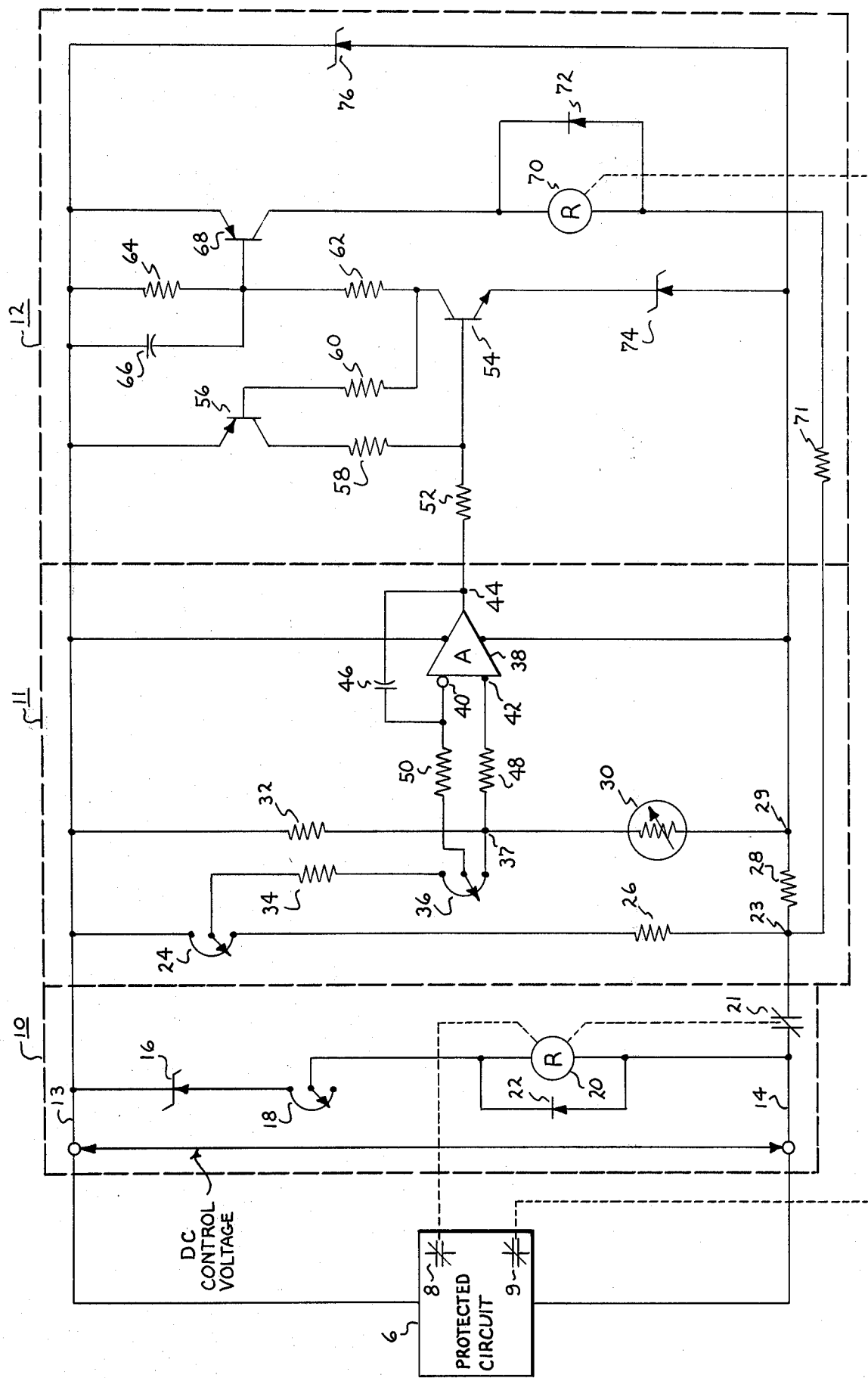
FIG. 1 is a schematic illustration of a preferred embodiment of the present invention.

Referring now to the drawings, FIG. 1 is a schematic illustration of a preferred embodiment of the present invention as connected to a circuit to be protected illustrated simply as a block 6. For ease in understanding, the circuit of the present invention is divided into three sections: an instantaneous relay section 10; an amplifier section 11; and a time delay relay section 12. A pair of input leads 13 and 14 are provided from the circuit 6 which may be, for example, an SCR bridge for supplying the field current to a dynamoelectric machine as previously explained. The instantaneous relay section 10 is connected across the input leads 13 and 14 and includes the series combination of a zener diode 16, a potentiometer 18, and a parallel combination of an instantaneous relay coil 20 and a bypass diode 22. A pair of normally closed relay contacts 21, associated with coil 20, is tied in series with input lead 14 and a juncture 23 included as one input to the amplifier section 11.

The amplifier section 11 includes, in electrical series between input lead 13 and juncture 23, a second potentiometer 24 and a fixed value resistor 26. Another fixed value resistor 28 is tied between juncture 23 and a second juncture 29. Between juncture 29 and input lead 13 are connected in series a suitable temperature responsive element such as a thermistor 30 and another fixed value resistor 32. Still another fixed value resistor 34 is connected between a slider arm of the potentiometer 24 and one end of at third potentiometer 36, the other end of which is tied to a point 37 at the junction of resistor 32 and thermistor 30. An operational amplifier 38, connected between input line 13 and juncture 29 includes a pair of input terminals 40 (inverting) and 42 (non-inverting), an output terminal 44, and is further provided with a feedback capacitor 46 tied between output terminal 44 and input terminal 40. A fixed value resistor 48 is connected from point 37 to input terminal 42 of amplifier 38, while another fixed value resistor 50 is tied between a slider arm of potentiometer 36 and input terminal 40 of operational amplifier 38.

Time delay relay section 12 is tied to amplifier section 11 at four points, namely: to input lead 13; to the output terminal 44 of operational amplifier 38; to juncture 29; and to juncture 23. The output terminal 44 of amplifier 38 is connected through a resistor 52 to the base of a first transistor 54 to provide an input signal to that transistor. A second transistor 56 has its emitter tied to input lead 13 and its collector tied through a resistor 58 to the base of transistor 54. The base of transistor 56 is connected through a resistor 60 to the collector of transistor 54. Between the collector of transistor 54 and input lead 13 is connected a pair of resistors 62 and 64, the latter being electrically paralleled with a capacitor 66 included to suppress spurious signals which would have a tendency to cause unpredictable operation. A third transistor 68 has its emitter connected to input lead 13, its base lead connected to the juncture of resistors 62 and 64, and its collector tied through a time delay relay 70 and a series resistor 71, to juncture 23 of the amplifier section 11. Also, like instantaneous relay 20, the time delay relay 70 includes a bypass diode 72 connected electrically parallel therewith. Finally, a second zener diode 74 is tied between the emitter of transistor 54 and juncture 29, while a third zener diode 76 is connected between juncture 29 and input lead 13 to provide a constant power supply for the circuit.

Figure 2:
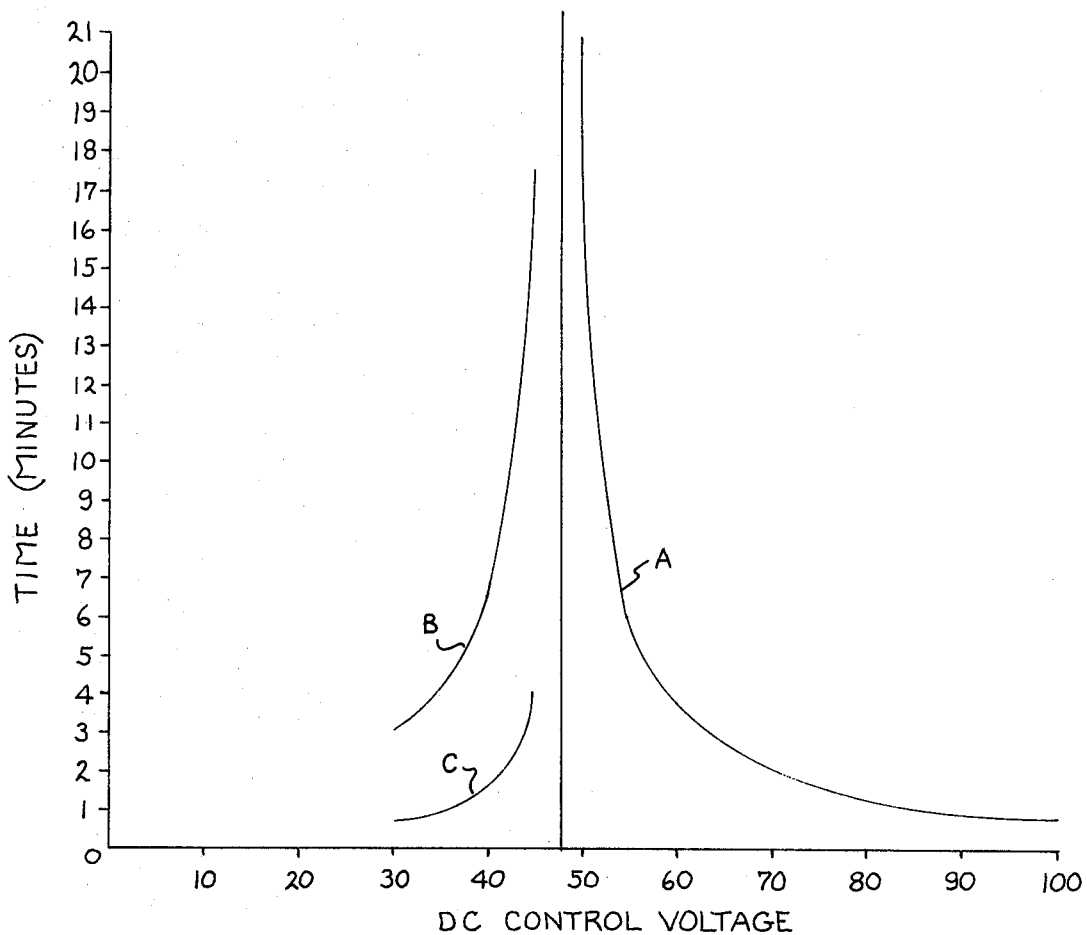
FIG. 2 is a voltage-time graph including waveforms relating to certain operational characteristics of the circuit shown in FIG. 1.

Reference is now made to FIG. 2 of the drawings which is a graphic illustration of certain operational characteristics of the circuit shown in FIG. 1. The illustrated graph provides a comparison on Cartesian coordinates between the magnitude of a d.c. control voltage applied to the circuit and the time required for responsive action by the circuit with the application of a particular voltage. The d.c. control voltage is plotted along the X-axis while elapsed time is plotted along the Y-axis. The values shown are, of course, arbitrary in the sense that they relate to a particular example which has been selected for purposes of explanation. The curves A, B and C shown in the graph of FIG. 2 depict certain operational aspects of the circuit as it relates to time delay relay 70. (It should be noted that each of these curves assumes, for purposes of illustration, a step change in voltage and, although other types of voltage changes will produce different shape characteristics, the principles of operation are the same.) Curve A depicts the relationship between the magnitude of the d.c. control voltage above a normal value (arbitrarily selected for purposes of illustration at 48 volts) and the time, in minutes, required to elapse before time delay relay 70 becomes energized, while curve B describes the relationship between the magnitude of the d.c. control voltage below the normal value and the time in seconds or minutes that must elapse for time delay relay 70 to deenergize. Curve C relates to the reset time of the time delay relay 70, or that time required to elapse after the d.c. control voltage has dropped below the normal value for the output voltage of operational amplifier 38 to decrease to negative saturation.

Figure 3:
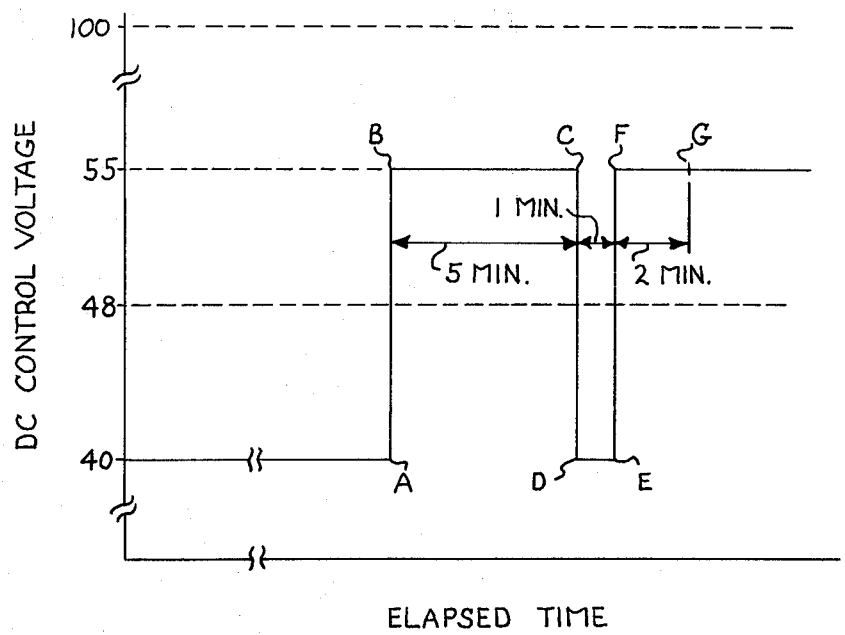
FIG. 3 is a graph ilustrating the time-control voltage relationship during certain operational periods of the circuit shown in FIG. 1.

FIG. 3 of the drawings discloses a curve illustrating the operational relationship between the level of the d.c. control voltage, plotted along the Y-axis, and elapsed time, plotted along the X-axis. The reference letters A through G relate to certain opeational points of interest which will be explained under a discussion of the circuit operation below.

The operation of the FIG. 1 circuit, which will now be described, will be more easily understood if one remembers that the circuit provides for an operation with respect to the protected circuit under two distinct sets of circumstances, namely: when the current or voltage in the protected circuit rises to a critical value high enough to warrant immediate protection of that circuit; and, when the current or voltage in the protected circuit while not rising so high as to warrant immediate action, does rise high enough for a protracted period of time such that, eventually, protection of the protected circuit would be warranted. The type of operation performed with respect to the protected circuit will, of course, vary in accordance with the individual needs. For example, the operation may be to remove the protected circuit from the power source, or to switch to a lower voltage, or as in one actual case the operation performed was to switch the power regulation of the protected circuit from an automatic mode to a manual mode. This portion in the overall protection scheme does not, however, form a part of the present invention and is not, therefore, illustrated in detail.

Referring now to FIG. 1, a d.c. control voltage proportional to the voltage or current applied to the protected circuit 6 is shown applied to the circuit of the present invention via two leads 13 and 14. In respect to the first of the two sets of circumstances reference is made to instantaneous relay section 10 of FIG. 1. As the current or voltage in the protected circuit increases, and increased voltage is applied between input leads 13 and 14, an increased voltage is developed across zener diode 16, potentiometer 18, and the parallel combination of diode 22 and instantaneous relay 20. When the d.c. control voltage exceeds the critical voltage level, current through relay 20 will have increased to a level sufficient to cause energization of that relay which simultaneously opens the contacts 21 to isolate the remaining portions of the circuit of the present invention and initiates an appropriate protective action in the protected circuit 6. This latter action is illustrated by the dotted line connecting relay 20 to a pair of contacts 8 in the block 6. Zener diode 16 is included for the purpose of allowing relay 20 to be provided with sufficient energization current, while still holding the voltage across it to a level low enough such that it can deenergize quickly with a relatively high d.c. control voltage developed across both the zener diode 16 and the potentiometer 18. Potentiometer 18, is included for the purpose of adjusting the upper level voltage point, while diode 22 provides a discharge path for the collapsing field of deenergizing relay 20, thereby protecting the zener diode 16.

With respect to the second set of circumstances mentioned above, when the d.c. control voltage is less than the critical voltage level, the instantaneous relay section 10 is unaffected and may be disregarded with consideration being given to only the amplifier section 11 and the time delay relay section 12. Thus, consider a d.c. control voltage of less than the critical value as applied across input leads 13 and 14 through closed contacts 21 of instantaneous relay section 10 to develop a voltage across potentiometer 24 and resistor 26 of the amplifier section 11. Additional voltages are developed across resistor 34, potentiometer 36, thermistor 30, resistor 28 and resistor 32. The voltages developed across these components are, of course, dependent upon the relative resistances of the several components. Amplifier 38 is an operational amplifier designed to generate a positive or negative going output voltage, the polarity of which is dependent upon its input. That is, if the potential on the wiper arm of potentiometer 24 is positive with respect to point 37, a current will be established through resistor 50 to input 40, or summing point of amplifier 38, thereby causing a negative going output voltage to be generated. On the other hand, if the potential on wiper arm of potentiometer 24 is negative with respect to point 37, a current will be caused to flow through resistor 50 in a direction away from the summing point, thereby causing a positive going output voltage to be generated at the output of the amplifier. It should be clear that the voltage divider network including resistor 32, thermistor 30, and resistor 28 is fixed with respect to the d.c. control voltage during periods of temperature stability.

Thermistor 30 is included for the purpose of guarding against variations in the ambient temperature which could cause variations in circuit operation, primarily with respect to the zener diode 76. The thermistor normally has a positive temperature coefficient resulting in an increased resistance with an increased temperature. Hence, the voltage thereacross increases with a rise in ambient temperature. Thus, whereas the normal operating voltage level would ordinarily tend to drift with temperature variations, the inclusion of thermistor 30 serves to stabilize that level as determined by the position of the wiper arm on potentiometer 24. If desired, the thermistor 30 can be selected to over compensate for any temperature drifts in the zener diode 76 so that a shorter time delay is achieved at higher temperatures. The potential at juncture 37 with respect to lead 13, therefore, is essentially constant with respect to the d.c. control voltage. Hence, by adjusting the wiper arm of potentiometer 24 a current can be caused to flow either to or away from juncture point 37 with respect to the wiper arm of potentiometer 24 by moving the wiper arm either upwardly or downwardly, respectively. Potentiometer 34, therefore, serves as a means for adjusting the normal maximum operating voltage level.

As the current or voltage in the protected circuit increases, the d.c. control voltage applied via input leads 13 and 14 and through closed contacts 21 also increases. When the level of that voltage rises above the predetermined normal voltage level, operational amplifier 38 begins generating a positive going voltage which, if allowed to continue, would eventually rise to a value high enough to cause time delay relay 70 to energize. In general, therefore, depending on the level of the d.c. control voltage applied, operational amplifier 38 is either generating a positive going voltage, a negative going voltage, or as the case would be if the input applied to the amplifier continued for a long enough period of time, positive or negative saturation. During normal operation, that is, when the current or voltage in the protected circuit is below some safe level, the d.c. control voltage is below the normal maximum voltage level, and hence, operational amplifier 38 will have integrated down to negative saturation. When the d.c. control voltage rises above the normal voltage level, operational amplifier 38 will begin integrating positively toward positive saturation and would continue this positive progression until either instantaneous relay 20 or time delay relay 70 is energized, or the control voltage drops below the normal voltage level.

The rate at which amplifier 38 integrates in the positive or negative direction may be varied by adjusting the slider arm of potentiometer 36. By moving the arm upwardly as shown in FIG. 1, amplifier 38 would be caused to integrate faster; or stated another way, the rate of the amplifier output voltage increase would be greater than if the arm were moved downwardly. The time required for amplifier 38 to integrate down to negative saturation is termed as reset time and by referring to curve B of FIG. 2 of the drawings a graphical illustration of that d.c. voltage-time relationship of the reset time may be seen. For example, referring to curve B, it may be seen that if the amplifier has gone to positive saturation and the d.c. control voltage then drops to below the normal voltage (arbitrarily selected at 48 volts for purposes of illustration), to say 37 volts, it will take approximately 5 minutes for the amplifier to go to negative saturation. The dropout time is that time required for time delay relay 70 to deenergize after having been energized because of the d.c. voltage remaining above the normal maximum value of some relatively long period of time. This relationship is shown in curve C which, like curve B relating to the reset time, is important in obtaining ann operational profile of the subject invention and it is seen that, for example, in the present illustration that at a voltage of approximately 37 volts it will take about one minute for the relay to drop out.

Reference is now made to time-delay section 12 which receives as an input, the output voltage generated by operational amplifier 38 of amplifier section 11. That voltage is applied through resistor 52 to the base of transistor 54. Thus, assuming once again an increase in the current or voltage in the protected circuit such that the d.c. control voltage applied across input leads 13 and 14 once again rises. When that voltage rises above the normal maximum voltage level as determined by the position of the wiper arm on potentiometer 24, the operational amplifier 38 begins to integrate in a positive direction at a rate determined by the position of the wiper arm on potentiometer 34. When the positive going voltage becomes more positive than the voltage appearing across zener diode 74, transistor 54 will conduct causing transistor 68 to conduct and thereby energize time delay relay 70 the operation of which performs a protective action to the circuit 6 as illustrated by the dotted line connecting relay 70 with a pair of contacts 9 in block 6. Transistor 56 is included merely to provide additional base current for transistor 54 so as to speed up the conduction of transistor 68 by increasing the collector current of transistor 54 when that latter transistor is rendered conductive. Thus, transistor 54 is the gating switch that is responsible for the actuation of time delay relay 70.

Zener diode 76 and resistor 28 are included to help develop the proper voltages for the circuit, while capacitor 66 provides a means for suppressing anomalous spike voltages which could possibly cause unpredictable operation. Diode 72, like diode 22 of the instantaneous relay section 10, serves to provide a low resistance discharge path for the collapsing fields of deenergizing relay 70.

As an aid in understanding the complete circuit more clearly, a few examples will be presented wherein the d.c. control voltage will be raised or lowered in a step fashion so as to affect circuit operation. In actual operation, of course, the change in d.c. control voltage normally would be gradual rather than an instantaneous step, but in explaining the operation of the subject circuit, understanding thereof is made most clearly by the use of a step voltage signal. Thus, as a first example, assume that current through the protected circuit rises so as to cause the d.c. control voltage to step up instantaneously from a steady state level below 48 volts, which is the normal maximum voltage level arbitrarily chosen in the illustrated embodiment of the subject invention, to a level of 100 volts arbitrarily chosen as the critical level. Immediately the current through zener diode 16, potentiometer 18, and instantaneous relay 20 increases sufficiently to cause both contacts 21 of the instantaneous relay and the contacts 8 associated with the protected circuit to open and thereby effect the protective action. Once the current through the protected circuit decreases to a safe level, the d.c. control voltage drops to below the 48 volt level allowing instantaneous relay 20 to deenergize. In accordance with the needs of the overall system, suitable alarms, manually resettable contacts, etc. may be provided. These, however, do not form a part of the present invention and are not, therefore, shown or described in detail.

As a second example, assume the d.c. control voltage has been stepped up instantaneously from a steady state level of less than the 48 volt level to some value greater than 48 volts, for example, 55 volts. At that time, operational amplifier 38 begins to integrate from negative saturation, the steady state condition of the amplifier under normal conditions, toward positive saturation. In such an example, it should be clear that instantaneous relay 20 will not respond to the increased d.c. control voltage since that relay is only responsive to the control voltage when it reaches or exceeds the critical voltage level which in the illustrated embodiment is 100 volts. Therefore, with reference to FIG. 2 of the drawings, in particular, curve A, which reflects the operation of time delay section 12, it is shown that time delay relay 70 will energize after 6 minutes has elapsed. When relay 70 is energized, the appropriate protective action symbolized by the contacts 9 will be initiated and desired alarms, etc. actuated.

If the full 6 minutes had not elapsed before the d.c. control voltage increased to some level above 55 volts, then it should be equally clear that relay 70 will energize in a shorter period of time. By the same token, a decrease in the d.c. control voltage from the 55 volt level down to some lower level, still above 48 volts, before relay 70 has energized, will require a longer period of time to elapse than the 6 minutes required at the 55 volt level. In either of these last two examples, however, it must be noted that the circuit of the subject invention includes the ability to take into consideration recent levels of current flow through the protected circuit when "deciding" if and at what time relay 70 should energize. To bring this point out more clearly, as a third example assume that the history of current through the protected circuit varied in a stepped manner as shown in FIG. 3 of the drawings so as to cause the d.c. control voltage to rise from the steady state level below 48 volts (point A), say 40 volts, to some higher value below 100 volts, again for example 55 volts (point B), where it remained for five minutes (point C) which is less than the time required to elapse to cause time delay relay 70 to energize. Further assume that the current or voltage in the protected circuit then decreased causing the d.c. control voltage to decrease down below the normal voltage level of 48 volts (point D), say 40 volts, where it stayed there for 1 minute (point E) only to rise again to the 55 volt level (point F). In such an example even though the d.c. control voltage rose from the steady state level below 48 volts to the 55 volt level as shown in FIG. 2 of the drawings, the circuit of the subject invention will not have to wait the indicated 6 minutes before causing relay 70 to energize since the circuit, through opeational amplifier 38 and capacitor 66, includes the ability to "remember" that only before the sudden decrease in d.c. control voltage, current flow through the protected circuit had persisted at a relatively high level for a relatively long period of time such that a much shorter period of time than six minutes must elapse while operating at the 55 volt d.c. control voltage level to cause relay 70 to energize. That point is indicated at point G in FIG. 3 of the drawings which is shown to be about two minutes after the second rise to the 55 volt level (i.e. point F). The circuit, therefore, is able to recall the recent history of current levels in the protected circuit when deciding at what time relay 70 should energize.

Thus, the above-described circuit provides an overcurrent or overvoltage protection circuit having the dual ability to open the protected circuit instantaneously in the event current therethrough or voltage thereacross increases to some unacceptably high level, and to open the protected circuit should the current or voltage therein continue at some high level, although lower than the abovementioned unacceptably high level, for an unacceptably long period of time.

While there is shown and described a specific embodiment of this invention, it will be understood that this invention is not limited to the particular construction shown and described above, and it is intended by the appended claims to cover all modifications within the spirit and scope of this invention.

What is claimed is:

1. A signal monitoring circuit responsive to a control voltage having a level proportional to the magnitude of the signal being monitored comprising:
   a. means responsive to said control voltage to generate a controlling signal which varies in a first direction toward a first polarity when said control voltage rises above a predetermined voltage level and varies in a second direction opposite said first direction when said control voltage becomes less than said predetermined voltage level;
   b. switch means having a first state and a second state and responsive to said controlling signal to assume said first state when said controlling signal reaches a first value while varying in said first direction, and to assume said second state when said controlling signal reaches said first predetermined value while varying in said second direction; and,
   c. relay means having first and second states of and being responsive to the state said switch means to assume said first state whenever said switch means assumes a first state, and to assume said second state whenever said switch means assumes said second state.

2. The invention in accordance with claim 1 wherein the means to generate the controlling signal responds to the value of the control voltage to determine the rate at which the controlling signal varies.

3. The invention in accordance with claim 1 wherein the means to generate the controlling signal includes integrating means responsive to the value of the control voltage to vary the rate of integration and thus vary the time required for the controlling signal to reach said first value.

4. The invention in accordance with claim 1 further including an additional relay means operative in response to a prescribed value of said control voltage.

5. The invention in accordance with claim 4 wherein the prescribed value to which said additional relay means is responsive is greater than said predetermined voltage level.

* * * * *

UNITED STATES PATENT AND TRADEMARK OFFICE
CERTIFICATE OF CORRECTION

PATENT NO. : 3,876,914
DATED : April 8, 1975
INVENTOR(S) : Stephen J. Lukas

It is certified that error appears in the above-identified patent and that said Letters Patent are hereby corrected as shown below:

Column 6, line 9, cancel "34" and substitute --24--.
line 59, cancel "ann" and substitute --an--.

Column 10, line 1, cancel "of".
line 2, after "state" insert --of--.

Signed and Sealed this eleventh Day of May 1976

[SEAL]

Attest:

RUTH C. MASON
Attesting Officer

C. MARSHALL DANN
Commissioner of Patents and Trademarks